Feb. 19, 1957 R. T. DAVIS Re. 24,277

CAP ORNAMENT AND PLUME HOLDER

Original Filed May 4, 1954

Roscoe T. Davis
INVENTOR

BY C. A. Crowley & Co.
ATTORNEYS.

United States Patent Office

Re. 24,277
Reissued Feb. 19, 1957

24,277

CAP ORNAMENT AND PLUME HOLDER

Roscoe T. Davis, Greenville, Ill., assignor to
De Moulin Bros. & Co., Greenville, Ill.

Original No. 2,721,410, dated October 25, 1955, Serial No. 427,511, May 4, 1954. Application for reissue November 15, 1956, Serial No. 623,276

2 Claims. (Cl. 41—34)

Matter enclosed in heavy brackets [ ] appears in the original patent but forms no part of this reissue specification; matter printed in italics indicates the additions made by reissue.

This invention relates to a cap ornament and plume holder.

It is an object of this invention to provide a cap ornament and plume holder of the kind to be more particularly described hereinafter to combine a cap ornament which is secured to a cap band or cap cover with a receptacle for a plume so arranged that when a plume is not used the receptacle will be substantially covered to be concealed by the ornament.

It is another object of this invention to provide a cap ornament and plume holder which are unitarily formed together for ready manufacture to be later sold in place of the several articles frequently used with caps at the present time.

Other and further objects and advantages of the invention will be hereinafter described and the novel features thereof defined in the appended claims.

Figure 1:
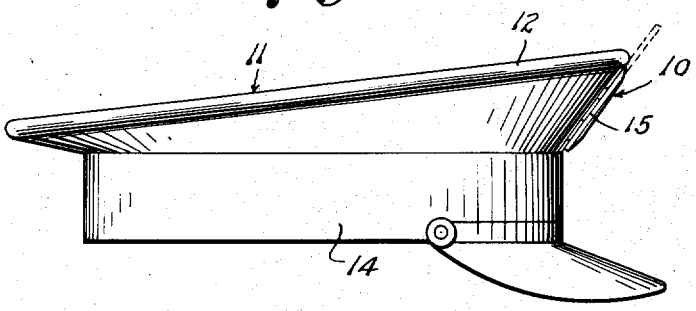
Figure 1 is a side elevation of a cap having an ornament and plume holder constructed according to an embodiment of my invention.
Figure 2:
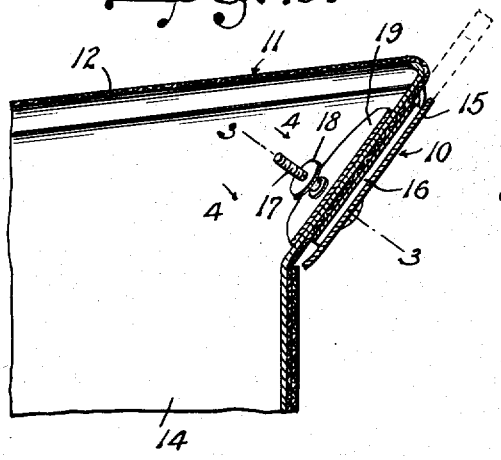
Fig. 2 is an enlarged fragmentary detailed cross section, partly broken away, of my invention.
Figure 3:
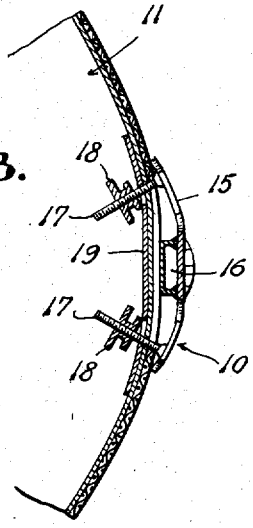
Fig. 3 is an enlarged fragmentary cross section taken on the line 3—3 of Fig. 2.
Figure 4:
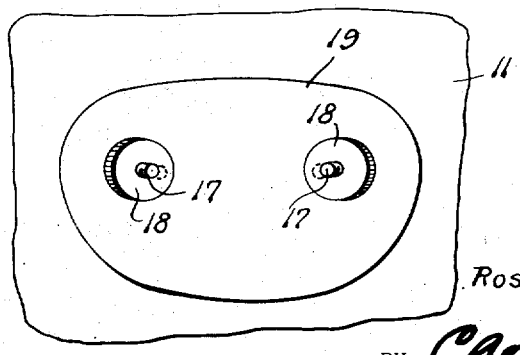
Fig. 4 is an enlarged cross section, partly broken away, taken on the line 4—4 of Fig. 2.

Heretofore a cap ornament and plume holder has been a continual source of annoyance for the person wearing the cap of a band or the like when it has come to secure a plume to the ornament and it is a principal purpose of this invention to provide a novel type of ornament with a tubular socket secured thereto wherein a socket is formed for receiving the stem of a plume to be worn by the user with his ornament pin. The old type of plume holder has been a source of annoyance due to the fact that the plume would be inserted through a button-hole in the top of the cap and the button riveted to the cap frame. In removing plumes from this type of holder, there has always been a tendency to bend the holder or tear the rivets loose and there has been no way to replace them without taking the cap entirely apart.

It is for this reason that the new type of ornament which has the plume socket or support as part of the ornament itself, offers many advantages.

In the drawings the numeral 10 designates generally a cap ornament and plume holder of the kind as to be more particularly described hereinafter for use on a cap 11 having a cover 12 thereon. The cover 12 is conventionally formed above the band 14 of the cap and the combined cap ornament and plume holder 10 is secured to the cover above the band.

The cap ornament is formed of a thin metal sheet 15 bearing the desired ornamentation thereon and a tubular socket 16 formed integral with the ornament 15. The tubular socket 16 is open at the opposite ends thereof and may be rectangular and flat in its general formation with a curved end portion for proper disposition between the ornament 15 and the front portion of the cap cover 12. Prongs 17 are formed integral with the ornament sheet 15 and extend laterally from the curved ends thereof. The prongs 17 are threaded throughout their length for the reception of a clamping nut 18 thereon for securing the cap ornament and plume holder 10 in its proper position on the front of cap 10.

A thin stabilizer sheet 19 which may be made of fiber is positioned inwardly of the cap and in encircling engagement with the prongs 17 between the cap and the nut 18. The fiber board washer or stabilizer further strengthens the cap itself and, of course, holds the ornament firmly in position. The novel ornament eliminates the unsightliness of a separate plume socket extending through the cap top and in a conspicous way when the cap is being used without a plume. Heretofore in removing plumes from a holder there has always been a tendency to bend the holder or tear the retaining rivets loose and there is no way to replace them without taking the cap entirely apart.

While the specific details of one embodiment of this invention have been herein shown and described, the invention is not confined thereto, as changes and alterations may be made without departing from the spirit and scope thereof as defined in the appended claims.

What is claimed is:

*1.* An improved cap ornament and plume holder comprising a substantially flat ornament having laterally extended curved ends for attachment to a cap, spaced threaded prongs carried by the curved ends of said ornament extensible through a portion of said cap, clamping nuts engageable with said prongs for securing said ornament on said cap, a vertical hollow open-ended tube formed integral with said ornament on the rear surface thereof between said prongs for receiving the stem of a plume therein, and a flat back board on said prongs on one side of said cap between said cap and said threaded prongs.

*2. An improved cap ornament and plume holder comprising a substantially flat ornament having laterally extended curved ends for attachment to a cap, spaced threaded prongs carried by the curved ends of said ornament extensible through a portion of said cap, clamping nuts engageable with said prongs for securing said ornament on said cap, and a vertical hollow open ended tube carried by said ornament on the rear surface thereof between said prongs for receiving the stem of a plume therein.*

References Cited in the file of this patent
or the original patent

UNITED STATES PATENTS 2,154,210 Lev ---------- Apr. 11, 1939